US007784036B2

United States Patent
Tjong et al.

(10) Patent No.: US 7,784,036 B2
(45) Date of Patent: Aug. 24, 2010

(54) METHODS AND SYSTEMS FOR TRANSFORMING A PARSE GRAPH INTO AN AND/OR COMMAND TREE

(75) Inventors: Jung Tjong, Sunnyvale, CA (US); Prakash Bettadapur, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1355 days.

(21) Appl. No.: 11/149,063

(22) Filed: Jun. 8, 2005

(65) Prior Publication Data

US 2007/0006179 A1 Jan. 4, 2007

(51) Int. Cl.
G06F 9/45 (2006.01)
G06F 15/177 (2006.01)
G06F 9/00 (2006.01)

(52) U.S. Cl. .................... 717/136; 717/141; 713/2; 709/220

(58) Field of Classification Search ............ None
See application file for complete search history.

(56) References Cited

U.S. PATENT DOCUMENTS

| | | | |
|---|---|---|---|
| 5,778,233 A | 7/1998 | Velissaropoulos et al. | |
| 6,278,455 B1 | 8/2001 | Baker | 715/716 |
| 6,457,173 B1 | 9/2002 | Gupta et al. | |
| 6,553,366 B1 | 4/2003 | Miller et al. | |
| 6,675,370 B1 | 1/2004 | Sundaresan | |
| 6,697,967 B1 | 2/2004 | Robertson | |
| 6,724,409 B1 * | 4/2004 | Maddocks et al. | 715/853 |
| 6,738,781 B1 * | 5/2004 | Mustoe et al. | 707/102 |
| 6,744,433 B1 | 6/2004 | Bastos et al. | |
| 6,907,572 B2 | 6/2005 | Little et al. | |
| 6,954,790 B2 | 10/2005 | Forslow | |
| 6,959,329 B2 * | 10/2005 | Thakor | 709/220 |
| 6,959,332 B1 | 10/2005 | Zavalkovsky et al. | |
| 7,054,901 B2 * | 5/2006 | Shafer | 709/203 |
| 7,054,924 B1 | 5/2006 | Harvey et al. | |
| 7,058,699 B1 | 6/2006 | Chiou et al. | |
| 7,072,946 B2 | 7/2006 | Shafer | |
| 7,072,985 B1 | 7/2006 | Lev-Ami et al. | |
| 7,149,738 B2 | 12/2006 | Kumar et al. | |
| 7,200,548 B2 | 4/2007 | Courtney | |
| 7,321,929 B2 | 1/2008 | Rolfe | |
| 2002/0198974 A1 | 12/2002 | Shafer | |
| 2003/0033589 A1 * | 2/2003 | Reyna et al. | 717/109 |

(Continued)

OTHER PUBLICATIONS

Sun Management Center; 3.6.1 User's Guide, (Chapter 20 only); Sun Microsystems; May 2006; 53 Pages.

(Continued)

*Primary Examiner*—Michael J Yigdall
*Assistant Examiner*—Ben C Wang
(74) *Attorney, Agent, or Firm*—Stolowitz Ford Cowger LLP

(57) ABSTRACT

Methods and systems for transforming a complex representation of computer code into a simplified representation of computer code are described. Parse nodes in a parse graph are traversed. Selected information contained within the parse nodes is hidden to create condensed parse nodes. The hiding prevents further processing of the selected information. Selected complex patterns in the parse graph are simplified to create simplified parse graph patterns. Branches on an AND/OR command tree are created from the parse nodes, the condensed parse nodes, and the simplified parse graph patterns.

18 Claims, 10 Drawing Sheets

U.S. PATENT DOCUMENTS

| | | |
|---|---|---|
| 2003/0046370 A1* | 3/2003 | Courtney .................... 709/220 |
| 2003/0048287 A1* | 3/2003 | Little et al. ................. 345/705 |
| 2003/0051008 A1 | 3/2003 | Gorthy et al. |
| 2003/0101240 A1 | 5/2003 | Courtney |
| 2004/0040016 A1* | 2/2004 | Pearce et al. ................ 717/141 |
| 2004/0078457 A1 | 4/2004 | Tindal |
| 2004/0090439 A1 | 5/2004 | Dillner |
| 2004/0117452 A1 | 6/2004 | Lee et al. |
| 2004/0168124 A1* | 8/2004 | Beisiegel et al. ............ 715/513 |
| 2004/0205562 A1 | 10/2004 | Rozek |
| 2005/0021502 A1* | 1/2005 | Chen et al. .................... 707/2 |
| 2005/0091068 A1 | 4/2005 | Ramamoorthy et al. |
| 2006/0031427 A1 | 2/2006 | Jain et al. |
| 2006/0080425 A1 | 4/2006 | Wood et al. |
| 2006/0129980 A1 | 6/2006 | Schmidt et al. |
| 2006/0230378 A1 | 10/2006 | Waddington et al. |
| 2006/0242403 A1 | 10/2006 | Joshi et al. |

OTHER PUBLICATIONS

Using the Command-Line Interface in Cisco IOS and Cisco IOS XE Software; Cisco Systems; Mar. 5, 2009; 14 Pages.

Network Appliance, Inc.; Netcache Command Line Interface; 1999-2000; www.billfernandex.com/biz/portfolio/netcache_cli/idex.htm; 2 Pages.

Allegro Software Development Corp.; Rom CLE Embedded CommandLine Interface (CLI) Toolkits; www.allegrosoft.com/rnomcli.html; 3 Pages.

Matsuka, Miroslav; IOAConvert: IOS to XML Router Configuration File Converter—Command Reference, CESNET Technical Report No. 30/2003; Oct. 12, 2003; 36 Pages.

Stolowitz Ford Cowger LLP; Related Case Listing; Nov. 11, 2009; 1 Page.

* cited by examiner

METHODS AND SYSTEMS FOR TRANSFORMING A PARSE GRAPH INTO AN AND/OR COMMAND TREE

RELATED UNITED STATES PATENT APPLICATIONS

This Application is related to U.S. patent application Ser. No. 11/149,052 by J. Tjong et al., filed on Jun. 8, 2005, entitled "Methods and Systems for Extracting Information from Computer Code," assigned to the assignee of the present invention, and hereby incorporated by reference in its entirety.

This Application is related to U.S. patent application Ser. No. 11/148,694 by J. Tjong et al., filed on Jun. 8, 2005, entitled "Methods and Systems for Transforming an AND/OR Command Tree into a Command Data Model," assigned to the assignee of the present invention, and hereby incorporated by reference in its entirety.

TECHNICAL FIELD

Embodiments of the present invention pertain to the processing of information using a computer system.

BACKGROUND ART

A command line interface (CLI) is a familiar user interface in which a command line and a prompt are displayed to a computer system user. The user enters an input after the prompt, and the computer acts on the input. An internal data structure, sometimes referred to as a parse chain or parse graph, is applied to the input in order to validate that the syntax (e.g., structure) of the input is correct.

There are applications that can benefit from knowledge of the underlying CLI syntax that is enforced by the parse graph. These applications include: creating CLI parsers for external management systems, providing CLI documentation, and creating external configuration data models. However, it is difficult to comprehend or programmatically extract the CLI syntax from the parse graph. The CLI syntax definitions are hard-coded in various files, and the compiler extracts only limited metadata at runtime. It is also difficult to transform the parse graph into different, meaningful forms useful with other applications such as those mentioned above.

Accordingly, a system and/or method that can extract useful information from the hard-coded CLI syntax definitions contained in parse graphs would be advantageous. A system and/or method that can represent the extracted information in a useful form would also be advantageous.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying," "hiding," "simplifying," "creating," "merging," "generating," "refining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Figure 1:
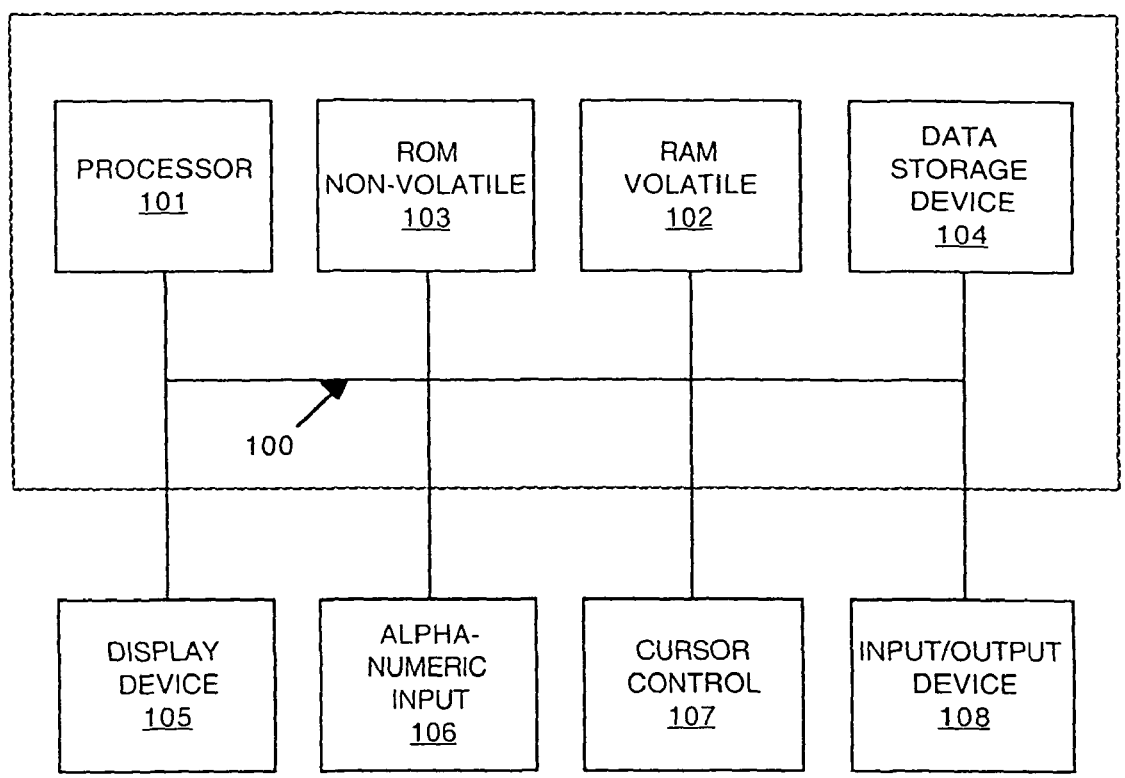
FIG. 1 is a block diagram of an exemplary computer system upon which embodiments of the present invention may be implemented.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network).

Overview

Figure 2:
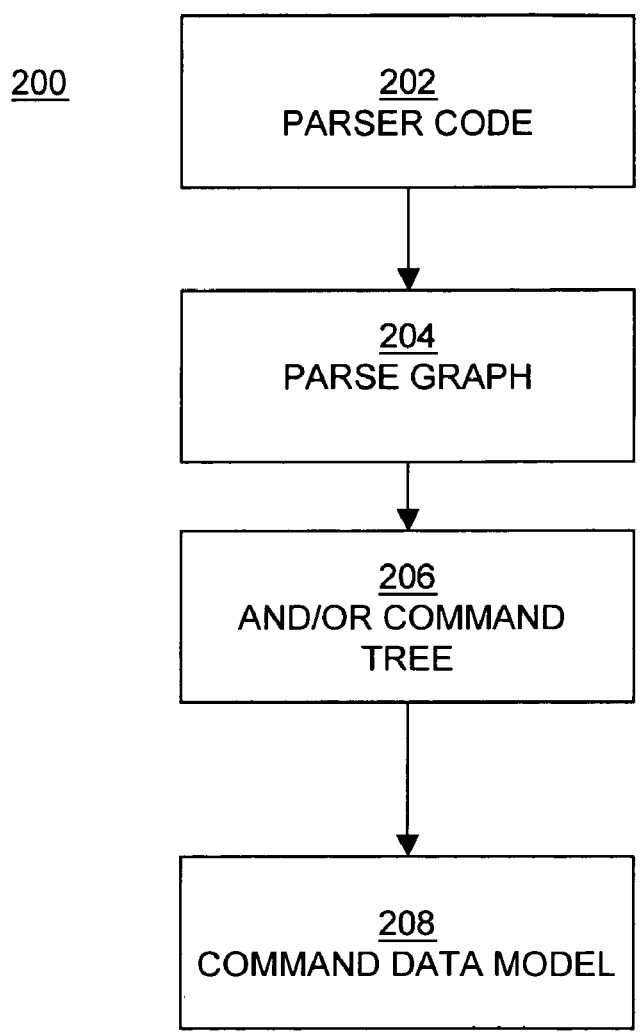
FIG. 2 is a block diagram showing the processing of information in a parse chain analyzer according to one embodiment of the present invention.

FIG. 2 is a block diagram showing the processing of information in a parse chain analyzer (PCA) system 200 according to one embodiment of the present invention. In the present embodiment, PCA system 200 extracts command line interface (CLI) command definitions from parse chain source codes and generates a programmatic interface (PI) object model. PCA system 200 can also be used to generate CLI command definitions and provide the definitions in formats that represent the syntax (structure or grammar) of the CLIs. This information can be used, for example, for CLI syntax documentation, CLI parsing, and CLI development tools.

In one embodiment, parser code 202 defines mechanisms for interpreting and validating the inputs (e.g., commands) that can be received in response to a CLI prompt. In one such embodiment, parser code 202 includes C-language constructs such as C chain files, C files, C macroinstructions (macros), and C header files. The macros define nodes in the parser data structure (the parse chain or parse graph). The macros are defined in C header files that are included in a C chain file. The nodes are interconnected to form the parse graph, which can be constructed of different types of nodes that are represented by different macros.

In the present embodiment, parse graph 204 is generated by extracting information from parser code 202. Specifically, in one embodiment, the information is extracted from the aforementioned C chain files, C files, C macros, and C header files. Additional information is provided in conjunction with FIGS. 3 and 4 below.

In the present embodiment, parse graph 204 of FIG. 2 is transformed into an AND/OR command tree 206. Additional information is provided in conjunction with FIGS. 5 through 7 below.

In the present embodiment, AND/OR command tree 206 of FIG. 2 is transformed into a command data model 208. Additional information is provided in conjunction with FIGS. 8 through 10 below.

Extracting Information from Computer Code

Figure 3:
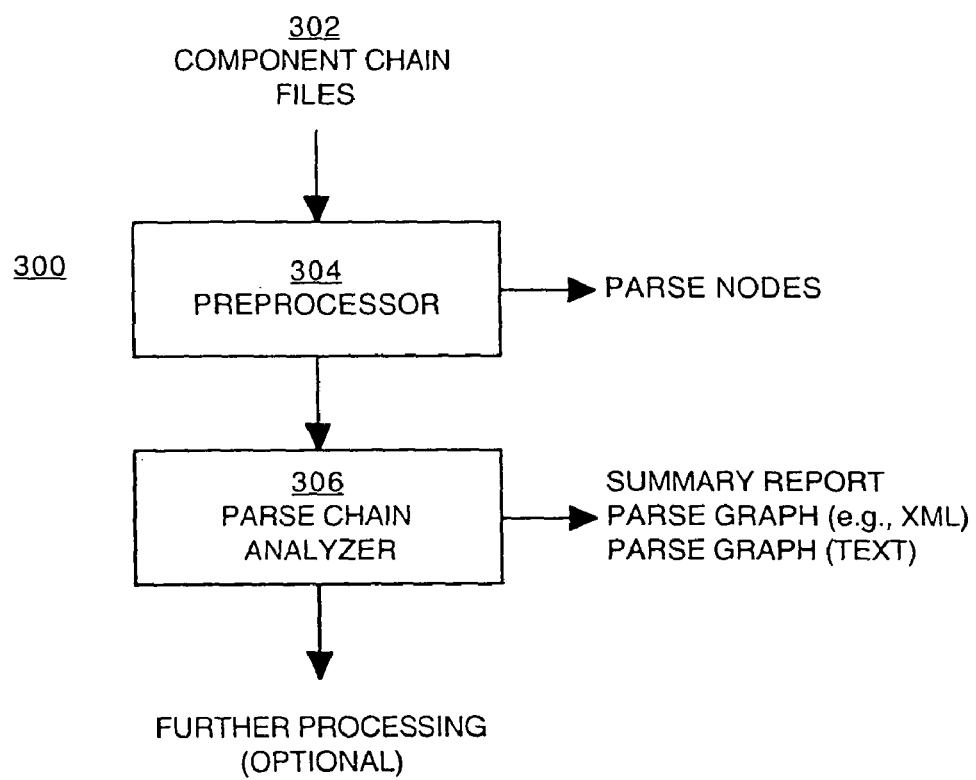
FIG. 3 is a block diagram of a system for extracting and manipulating parse chain information according to one embodiment of the present invention.

FIG. 3 is a block diagram of a system 300 for extracting and manipulating parse chain information according to one embodiment of the present invention. In the present embodiment, system 300 includes preprocessor 304 and parse chain analyzer (PCA) 306.

Component chain files (e.g., parse chain macros) 302 are input to preprocessor 304. In one embodiment, preprocessor 304 extracts parse chain information from the component chain files 302 by redefining each parse chain macro as an Extensible Markup Language (XML) string that encapsulates information in the macros' arguments as well as information in the macros' definitions. That is, a macro can include explicitly named elements as well as elements not explicitly named in the macro but pointed to by the macro, and both of these types of information are captured and written as XML strings.

In one embodiment, the output of preprocessor 304 includes a file that contains the parse node information derived from the component chain files 302 and written in XML format. In one such embodiment, the XML file containing the parse nodes is then fed to PCA 306, which stitches together the unconnected parse nodes into one or more parse graphs (in an XML format). In another such embodiment, this is accomplished using a JAVA™ program.

The resulting parse graph (e.g., in an XML format) is a superset of the information extracted from the component chain files 302. For example, the resulting parse graph can include the runtime metadata parse graph used by CLI parsers to validate an input, symbol information, and other information embedded in the parse nodes (e.g., the information pointed to by a macro).

In practice, there may be definition files (e.g., chain files) for multiple components, in which case a parse graph (or graphs) is generated for each component. In that case, the different parse graphs (that is, the XML-formatted parse graphs from PCA 306) can be linked together, in essence creating a single parse graph that consists of the multiple, individual parse graphs.

In one embodiment, the outputs of PCA 306 include a summary report written to a first file, a parse graph in an XML format written to a second file, and an easier to read text-based diagram of the parse graph written to a third file. The outputs of PCA 306 can be optionally processed further as described above (e.g., blocks 206 and 208 of FIG. 2). Furthermore, the outputs of PCA 306 provide information that is externally available (e.g., available outside the computer system to a human user), and thus can be used, for example, in external management systems, for validation of CLI syntax before product delivery, for processing of CLI inputs for discovery, in development and test processes, for transformation to still other formats, and for creating automated documentation from code.

To summarize, embodiments in accordance with the present invention are used for generating XML-tagged lines for each of the parser code macros in the component chain files 302, for linking the XML-tagged lines into a parse graph, for linking different XML-formatted parse graphs, and for generating an external representation of a parse graph (e.g., as an XML document).

The discussion above is illustrated by way of an example. Table 1 below contains an example of a parser definition according to one embodiment of the present invention. The example of Table 1 uses C-code to define a valid command.

TABLE 1

An Example of a Parser Definition

| | |
|---|---|
| EOLS | (cdp_int_duplex_eol, cdp_intfc_command, CDP_INT_LOG_DUP_MISMATCH); |
| KEYWORD | (cdp_int_duplex, cdp_int_duplex_eol, no_alt, "duplex", "Log the duplex-mismatches generated by CDP", PRIV_CONF\|PRIV_SUBIF); |
| KEYWORD | (cdp_int_mismatch, cdp_int_duplex, no_alt, "mismatch", "Log the CDP mismatches", PRIV_CONF\|PRIV_SUBIF); |
| KEYWORD | (cdp_int_log, cdp_int_mismatch, no_alt, "log", "Log messages generated by CDP", PRIV_CONF\|PRIV_SUBIF); |

In one embodiment, the C macros that represent the parse nodes are redefined to generate XML-tagged lines. In such an embodiment, information associated with a parse node is wrapped around a corresponding XML element. Table 2 contains an example of XML-tagged parse nodes for the parser definition of Table 1 according to one embodiment of the present invention. In one embodiment, the example of Table 2 represents the output of preprocessor 304 of FIG. 3.

TABLE 2

An Example of an XML-Tagged Parser Definition

<pca_pnode> <pca_type>EOLS</pca_type> <pca_file> "cfg_int_cdp.h" </pca_file>
<pca_name> cdp_int_duplex_eol </pca_name> <pca_acc> </pca_acc> <pca_alt>
</pca_alt>& lt;pca_func>eols_action</pca_func> <pca_args>&
Lcdp_int_duplex_eol</pca_args> <pca_arg_func> cdp_intfc_command
</pca_arg_func> <pac_arg_subfunc> ((((((((0 + 1) + 1) + 1) + 1) + 1) + 1) + 1)
</pca_arg_subfunc> </pca_pnode> ;" ";
<pca_pnode> <pca_type>KEYWORD</pca_type> <pca_file>
"cfg_int_cdp.h"</pca_file> <pca_name> cdp_int_duplex </pca_name> <pca_acc>
cdp_int_duplex_eol </pca_acc> <pca_alt> no_alt
</pca_alt> <pca_func>keyword_action</pca_func>& lt;pca_args>& amp;#38;
Lcdp_int_duplex </pca_args> <pca_arg_str>
    "duplex"</pca_arg_str> <pca_arg_help> "Log the duplex-mismatches
generated by CDP" </pca_arg_help> <pca_arg_priv> 0xf | 0x08000000
</pca_arg_priv> </pca_pnode> ;" ";
<pca_pnode> <pca_type>KEYWORD</pca_type> <pca_file>
"cfg_int_cdp.h"</pca_file> <pca_name>
cdp_int_mismatch</pca_name> <pca_acc>
cdp_int_duplex </pca_acc> <pca_alt> no_alt
</pca_alt> <pca_func>keyword_action</pca_func>< ;pca_args>& amp;#38;
Lcdp_int_mismatch </pca_args> <pca_arg_str>
    "mismatch"</pca_arg_str> <pca_arg_help> "Log the CDP mismatches"
</pca_arg_help> <pac_arg_priv> 0xf | 0x08000000
</pca_arg_priv> </pca_pnode> ;
" "; <pca_pnode> <pca_type>KEYWORD</pca_type> <pca_file>
"cfg_int_cdp.h"</pca_file> <pca_name> cdp_int_log </pca_name> <pca_acc>
cdp_int_mismatch </pca_acc> <pca_alt&g t; no_alt
</pca_alt> <pca_func>keyword_action</pca_func> <pca_args>& amp;#38;
Ldcp_int_log </pca_args> <pca_arg_str>
    "log"</pca_arg_str> <pca_arg_help> "Log messages generated by CDP"
</pca_arg_help> <pca_arg_priv> 0xf | 0x08000000
</pca_arg_priv> </pca_pnode> ;

In the example of Table 2, "pca_file" refers to the configuration file (or in some cases, the chain file) where the macro is instantiated; "pca_type" refers to the macro name; "pca_name" refers to the name of the parse node; and "pca_acc" and "pca_alt" refer to the accept and alternate transitions for parse nodes.

In one embodiment, the XML-tagged parse nodes are processed and connected together in a parse graph. Table 3 contains an excerpt of an XML document that describes a parse graph based on the XML-tagged parser definitions of Table 2 according to one embodiment of the present invention. In one embodiment, the example of Table 3 represents the output of PCA 306 of FIG. 3.

TABLE 3

An Example of an XML Document Describing a Parse Graph

. . .

<trans name="alt">
  <pnode name="cdp_int_log"
      type="KEYWORD"
      subsys="cdp"
      chainFile="cdp_chain.c"
      configFile="cfg_int_cdp.h"
      priv="0xf | 0x08000000"
      help=""Log messages generated by CDP""
      str=""log""
  >
<trans name="acc">
  <pnode name="cdp_int_mismatch"
      type="KEYWORD"
      subsys="cdp"
      chainFile="cdp_chain.c"
      configFile="cfg_int_cdp.h"
      priv="0xf | 0x08000000"
      help=""Log the CDP mismatches""
      str=""mismatch""

TABLE 3-continued

An Example of an XML Document Describing a Parse Graph

```
        >
        <trans name="acc">
          <pnode name="cdp_int_duplex"
              type="KEYWORD"
              subsys="cdp"
              chainFile="cdp_chain.c"
              configFile="cfg_int_cdp.h"
              priv="0xf | 0x08000000"
              help=""Log the duplex-mismatches generated by
                  CDP""
              str="mismatch""
          >
          <trans name="acc">
            <pnode name="cdp_int_duplex_eol"
                type="EOLS"
                subsys="cdp"
                chainFile="cdp_chain.c"
                configFile="cfg_int_cdp.h"
                priv="0xf | 0x08000000"
                subfunc="((((((0 + 1) + 1) + 1) + 1) + 1) + 1)"
                func="cdp_intfc_command"
            >
            </pnode>
          </trans>
          </pnode>
        </trans>
        </pnode>
      </trans>
    </pnode>
  </trans>
. . .
```

Figure 4:
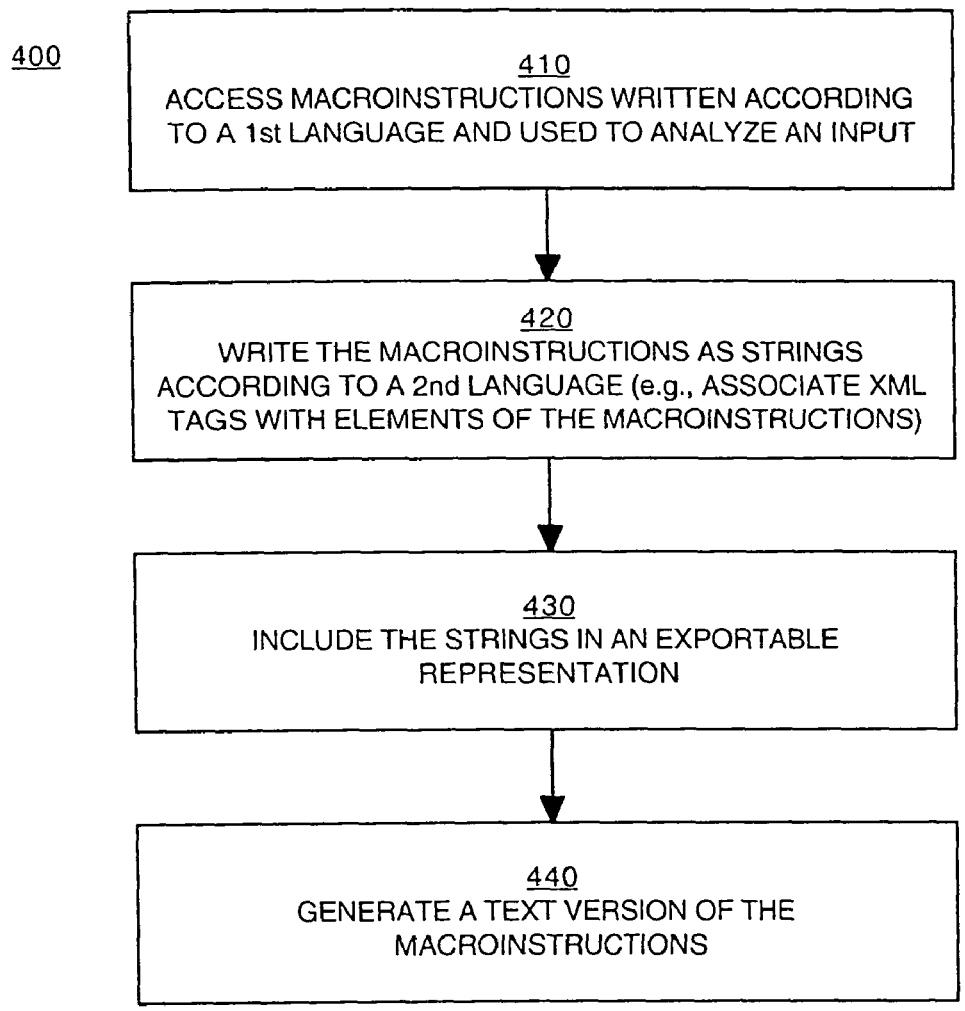
FIG. 4 is a flowchart of a method for extracting and manipulating parse chain information according to one embodiment of the present invention.

FIG. 4 is a flowchart 400 of a method for extracting and manipulating parse chain information according to one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed. In one embodiment, flowchart 400 is implemented as computer-readable program code stored in a memory unit of computer system 112 and executed by processor 101 (FIG. 1).

In step 410 of FIG. 4, in one embodiment, macroinstructions that are used to analyze an input are accessed. In one embodiment, the input is a command that is entered in response to a command line interface prompt. In another embodiment, the macroinstructions define parse nodes in a data structure (e.g., a parse graph or a parse chain) that is used for testing the input for proper syntax. The macroinstructions are written according to a first computer system language. In one embodiment, the macroinstructions are written in a C language.

In step 420, in one embodiment, the macroinstructions are rewritten as strings according to a second computer system language. In one embodiment, XML tags are associated with elements of the macroinstructions, such that the macroinstructions are rewritten in an XML format.

In step 430, in one embodiment, the strings are included in an exportable representation. In one such embodiment, the exportable representation is an XML document. In step 440, in another embodiment, the strings are used to generate a textual version of the data structure.

Transforming a Parse Graph into an AND/OR Command Tree

Figure 5:
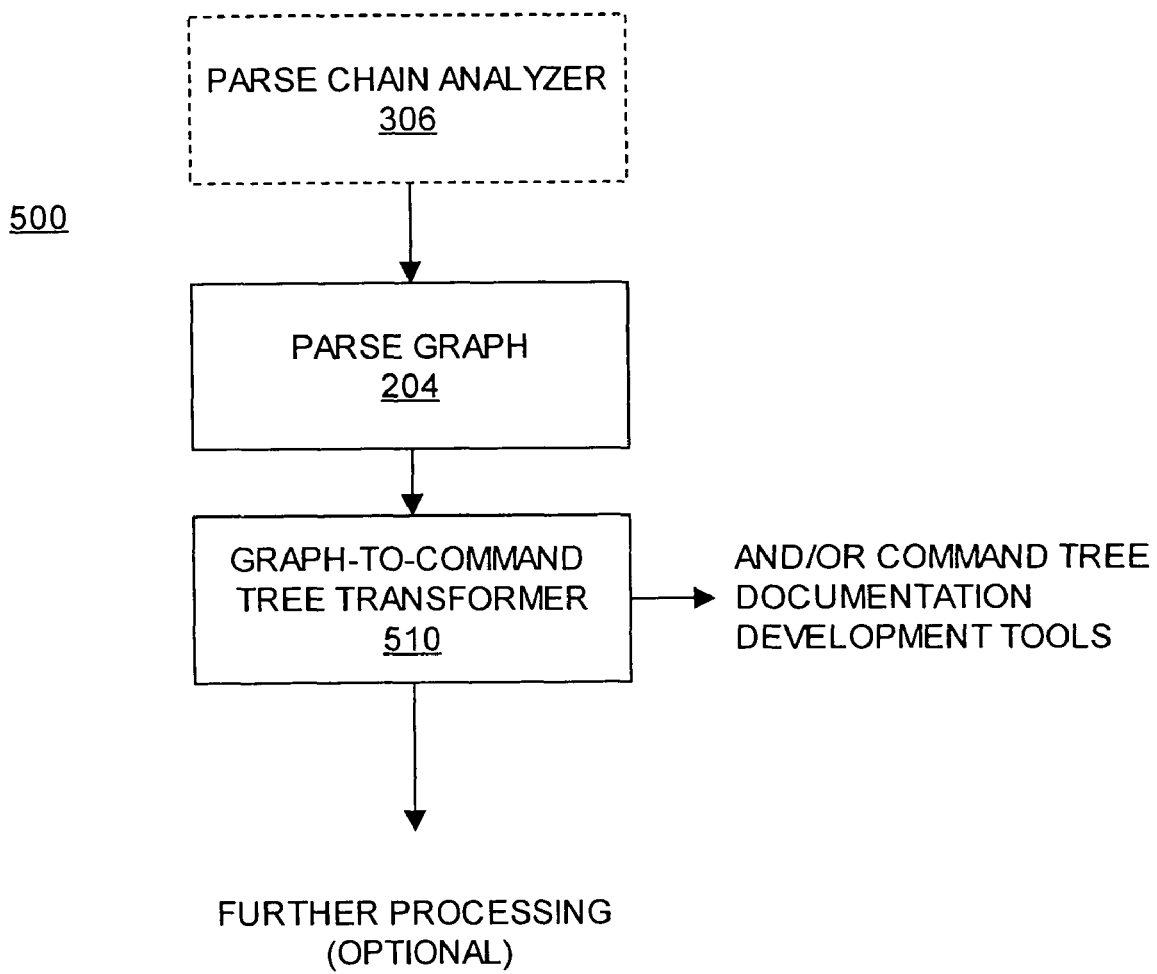
FIG. 5 is a block diagram of a system for transforming a parse graph into an AND/OR command tree according to one embodiment of the present invention.

FIG. 5 is a block diagram of a system 500 for transforming a parse graph into an AND/OR command tree according to one embodiment of the present invention. In the present embodiment, system 500 includes an optional parse chain analyzer 306, a parse graph 204, and a graph-to-command tree transformer 510. This portion of the present invention is used to better express the underlying CLI syntax by transforming parse graph 204 structure into a tree structure containing non-terminal AND/OR nodes that represent a sequence or choice of other AND/OR nodes or terminal token nodes.

The functionality of the optional parse chain analyzer 306 was previously described in conjunction with FIG. 3. One of the outputs of parse chain analyzer 306 is a parse graph 204. Parse graph 204 is a representation of CLI instructions. Parse graph 204 is an input to system 500.

Parse graph 204 contains branches. Each branch may have one or more nodes that allow the branch to fork out. Branches and nodes lead to or terminate in End of Line (EOL) nodes. Each branch, or node on a branch, of parse graph 204 that terminates in a common EOL node, translates into a command that is processed by the action function associated with that EOL node.

The graph-to-command tree transformer 510 operates by recursively traversing the branches in parse graph 204. While traversing several things are being done. Parse nodes within the branches of parse graph 204 that lead to or terminate in a common EOL node are collected into a command subtree rooted in an AND node. A command subtree set that shares common prefixes is created, and the branches that terminate in common EOL nodes are kept as a class. Nodes are collected based on their EOL because branches of parse graph 204 that terminate in common EOL nodes represent a single CLI command line.

Figure 6:
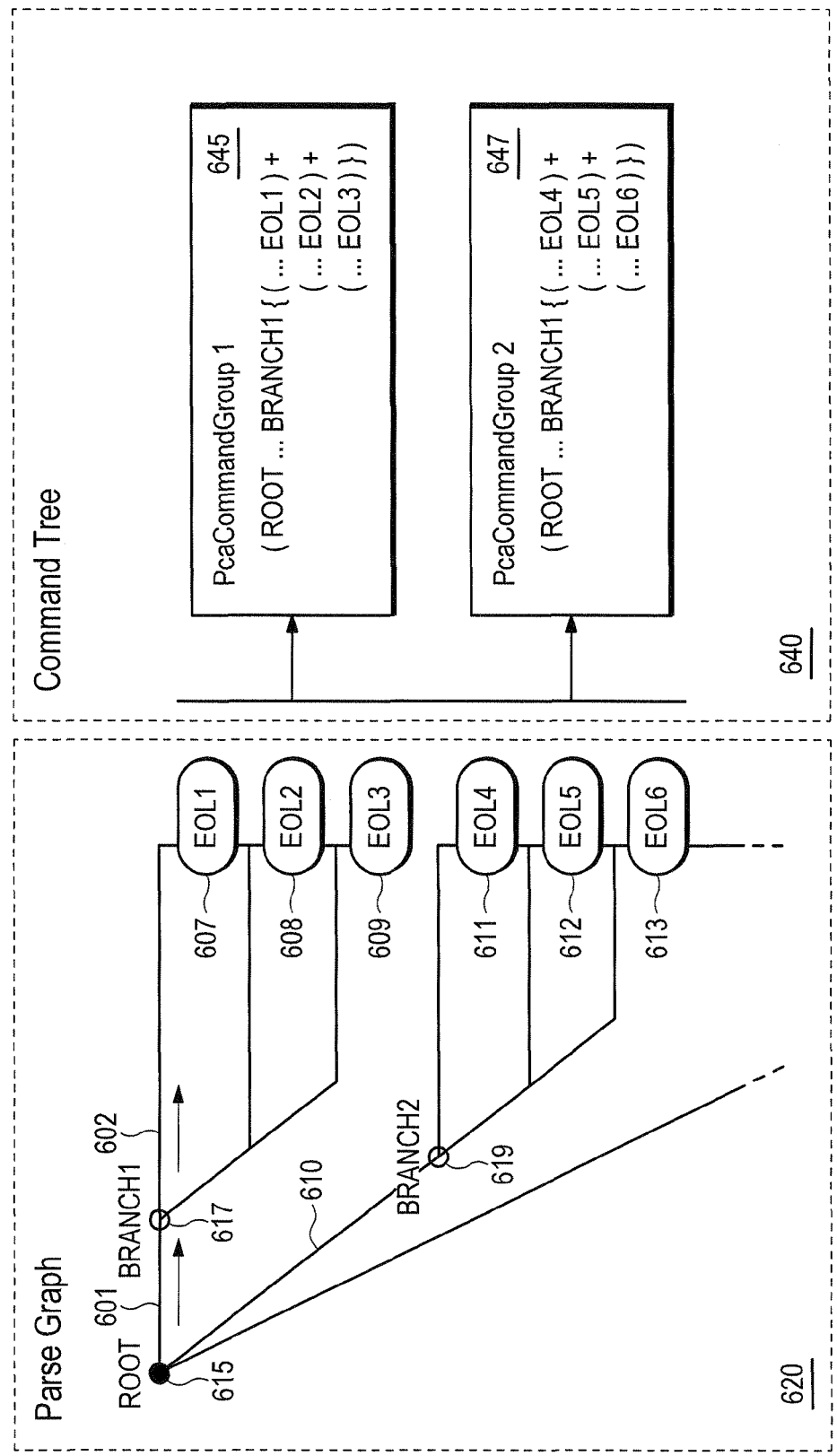
FIG. 6 is a block diagram of a parse graph-to-command tree node traversal according to one embodiment of the present invention.

FIG. 6 is a block diagram of a parse graph-to-command tree node traversal according to one embodiment of the present invention. FIG. 6 illustrates a simple example parse graph 620; with three parse nodes (615, 617 and 619). Parse node 615 is a root node, while parse nodes 617 and 619 are fork nodes. The parse graph 620 has two branches shown, branch one 601 and branch two 610. Branch one 601 is shown with three EOL nodes (607, 608, and 609). Branch two 610 is also shown with three EOL nodes (611, 612, and 613). The parse nodes (615, 617, and 619) in parse graph 620 are recursively traversed starting at a particular node continuing until a termination is reached. For example starting from root parse node 615 and traversing across branch 601, through fork node 617, across fork 602, and to the termination EOL1 607, constitutes a partial traversal of one path from the root parse node 615 to a termination point (such as 607). Each possible path way from a parse node such as the root node 615 or a fork node (such as 615) to a termination (such as EOL1 607) constitutes a parse node traversal that is performed in the parse graph-to-command tree traversal and transformation. Parse node traversals in other parse graphs could be more or less complex.

During the traversal portion of the graph-to-command tree transformation (510 of FIG. 5), one task that takes place is the conversion of parse graph branches into branches on a command tree. In FIG. 6, the converted branch 601 appears under the headings "PcaCommandGroup 1" 645 and the converted branch 610 appears under the heading "PcaCommandGroup 2" 647 in the AND/OR command tree 640. As part of the traversing, if commands in a parse graph branch are found to lead to a common EOL, they will be grouped together during the conversion. More complex parse graphs can involve nodes that are referenced from multiple points. This represents either a loop or a sharing of a common branch from different points in the parser graph.

With reference again to FIG. 5, a more in depth example of one operation that occurs during the traversal of parse graph 204 is shown by the example traversal of the command line shown in Table 4.

TABLE 4

An Example of a CLI Command Line

"mpls" "range" <min> [ "static" <static_min> <static_max> ]

Table 5 shows an example of a stand-alone AND/OR command tree representation of the CLI command line of Table 4. During traversal, over-arching command structures in parse graph 204 are identified, and at a lower level, definitions of commands are grouped based on a common root parse node.

TABLE 5

An Example of an AND/OR Tree Representation of a Command Line

```
Command-AND-node
{
    keyword ("mpls")
    keyword("label")
    keyword ("range")
    number (<min>)
    number (<max>)
    Data-AND-Node
    {
        keyword ("static")
        keyword (<static_min>)
        keyword (<static_max>)
    }
    eol (<mpls range function>)
}
```

Commands rooted in a common node generally share the same prefix. For example, the command "mpls label protocol" shares the same root node with the command "mpls label holddown" and the command "mpls label range." A complete AND/OR command tree that represents these three commands would group them together in a single container rooted to a single AND node. Table 6 shows an example representation of an AND/OR command tree of these three related commands.

TABLE 6

An Example of an AND/OR Command Tree of Three Commands Sharing a Root Node

```
Command-AND-node
{
    keyword ("mpls")
    keyword("label")
    Container-OR-node
    {
        Command-AND-node
        {
            keyword ("range")
            number (<min>)
            number (<max>)
            Data-AND-Node
            {
                keyword ("static")
                keyword (<static_min>)
                keyword (<static_max>)
            }
            eol (<mpls range function>)
        }
        Command-AND-node
        {
            keyword("protocol")
            options("tdp, ldp")
```

TABLE 6-continued

An Example of an AND/OR Command Tree of Three Commands Sharing a Root Node

```
            ol(<mpls protocol function>)
        }
        Command-AND-Node
        {
            keyword ("holddown")
            number (<holddown time>)
            number(<interval>)
            eol (<mpls holddown function>)
        }
    }
}
```

In one embodiment of the present invention, as the traversing during graph-to-command tree transformation 510 takes place, some information in parse graph 204 is hidden from further processing. This hiding is done prior to the transformation from parse graph 204 to AND/OR command tree 206 (see FIG. 2). This hiding can be thought of as hiding the noise in parse graph 204. Hiding does not erase information in parse graph 204. Rather, hiding minimizes internal nodes in parse graph 204 that contain information unnecessary to the grammar of a CLI command, such as directions for implementing the command. After this "noise" is hidden, it is easier to identify the actual command nodes and their associated command attributes. Hiding the information about command implementation also simplifies the syntax of the commands in parse graph 204, which makes it easier to recognize patterns within the structure of the commands.

As the traversing takes place, some simplification occurs to prepare for conversion of commands from parse graph 204 to AND/OR command tree. This simplification is part of the graph-to-command tree transformer 510. The simplification reduces complex patterns within parse graph 204, and eliminates nodes that do not contribute to the overall structure of parse graph 204 or the commands in parse graph 204. Parse graph 204 is checked for patterns that indicate optional nodes, false nodes, alternate nodes, and nodes that can be skipped. The identified nodes are either simplified or eliminated from being transformed to the AND/OR command tree, according to simplification rules.

As the traversing continues, creation of individual branches on the AND/OR command tree takes place as part of the graph-to-command tree transformer (510 of FIG. 5). The building of the AND/OR command tree is an iterative process that happens piecemeal during the traversing, rather than all at once at the end of the traversing process. As parse graph 204 is traversed, and after a particular portion of the graph, branch on the graph, or node on the graph has had any possible hiding or simplification done to it, it is compared to a set of parse graph-to-command tree conversion cases. As matches are detected, conversions are made. Table 7 shows an example of a simple conversion case. Table 7 shows that when a parse graph pattern matching the pattern shown under the heading "Parse Graph" is detected, it is converted to the pattern shown under the heading "Command Tree." The converted command is then added to the AND/OR command tree that is being created. There are many more conversion cases, describing conversions for known cases or patterns in parse graph 204 command structures. The conversion cases are selectively applied based on how the portion of a branch on parse graph 204 that is currently being analyzed by the traversal fits into the overall hierarchy of parse graph 204.

TABLE 7

An Example of a Parse Graph-to-Command Tree Conversion Case

| Parse Graph | Command Tree |
|---|---|
| A—B—C—EOL<br>      |<br>     EOL | A · (B + C) |

After parse graph 204 has been traversed and the AND/OR command tree has been built, refining of the AND/OR tree structure takes place. One phase of the refining is simplification of the AND/OR command tree branches. Each branch is analyzed for ways that the AND/OR expressions within it can be simplified according to rules of logical operation. Logical operations such as factoring out, eliminating optional nodes, and simplifying take place, according to a selected set of AND/OR command tree simplification cases. Table 8 is not an inclusive list of all possible simplifications, but it shows some before and after example cases of AND/OR command tree simplification.

TABLE 8

AND/OR Command Tree Simplification Case Examples

| Case | Before | After |
|---|---|---|
| Factor Out Suffix | ((A · X) + (B · X) + (C · X)) | ((A + B + C) · X) |
| Merge Single Node | (A · (B)) | (A · B) |
| Merge Empty Node | (A ( )) | (A) |
| Merge Subtrees | (A + (B + C)) | (A + B + C) |
| Merge Subtrees | (A · (B · C)) | (A · B · C) |

Another simplification operation that takes place is merger of duplicated branches. This is similar to the logical mergers that are performed on a single branch in Table 8. Normally, the branches of the parse graph that leads to a common EOL node are contiguous; when a new EOL node is seen the line for the previous EOL is completed. However updates to the parser code may result in non-contiguous branches of parser graph that lead to the same EOL. When a line or branch on the AND/OR command tree is created, it is checked to see if there is an existing branch that terminates on the same EOL. If there is, the existing line and new line need to be merged. If the existing line is part of a command group that contains another EOL, it is extracted from that command group before being merged with the new line. The lines are then merged together according to logical rules, which merge together common prefixes, suffixes, or pre-fixes and suffixes shared by the lines. Table 9 shows an example of merging an existing line and new line that share common prefixes. Table 9 also shows an example of merging an existing line and new line that share common suffixes. Many other merger cases are possible based on variations in prefixes, suffixes, or both.

TABLE 9

Command Tree Merger Case Examples

| Case | Before | After |
|---|---|---|
| Merge Prefix | Existing:<br>A · B · C {D · E · F · EOL1)(. . .)}<br>New:<br>A · B · G · D · E · F · EOL1 | A · B · (C + G) ·<br>D · E · F · EOL1 |

TABLE 9-continued

Command Tree Merger Case Examples

| Case | Before | After |
|---|---|---|
| Merge Suffix | Existing:<br>A · B · C {D · E · F · EOL1)(. . .)}<br>New:<br>A · B · C · X · Y · Z · EOL1 | A · B · C · ((D · E · F) +<br>(X · Y · Z)) · EOL1 |

The graph-to-command tree transformer (510 in FIG. 5) iteratively creates an AND/OR command tree in XML. After completion of graph-to-command-tree transformation 510 an exportable representation of the AND/OR command tree exists. Optionally, this exportable representation can be exported as is, or can be converted to other languages. Optionally, this exportable representation can be modified for use as a documentation tool and/or as a development tool. Optionally, this exportable representation can be processed further.

Figure 7:
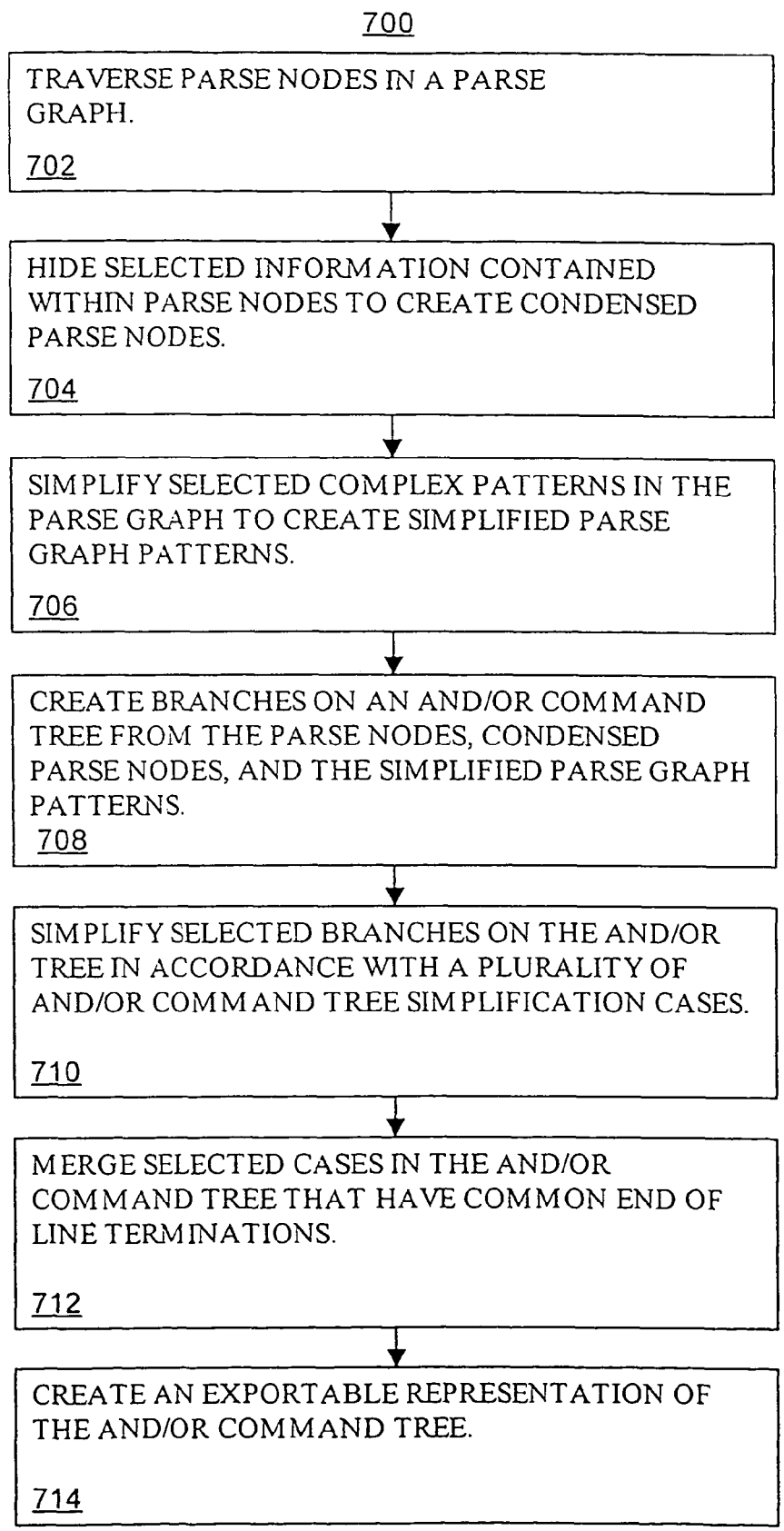
FIG. 7 is a flowchart of a method for transforming a parse graph into an AND/OR command tree according to one embodiment of the present invention.

FIG. 7 is a flowchart 700 of a method for transforming a complex representation of computer code into a simplified representation of computer code. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed. In one embodiment, flowchart 700 is implemented as computer-readable program code stored in a memory unit of computer system 112 and executed by processor 101 (FIG. 1).

In step 702 of FIG. 7, in one embodiment, parse nodes in a parse graph are traversed. The parse nodes are traversed depth-wise, to the EOL nodes at the end of each traversed branch. The parse nodes are also traversed breadthwise, to get an overview of the graph and detect an overarching command structure or structures in the parse graph. As the traversing takes place, parse nodes that terminate in a common EOL are identified. The identified parse nodes are collected into groups or sets. The groups/sets are converted into branches on an AND/OR command tree, with each group/set rooted in a common AND node on the command tree.

In step 704 of FIG. 7, in one embodiment, selected information, contained within parse nodes, is hidden to create condensed parse nodes. The information in the parse nodes of the parse graph is not deleted, but merely hidden to prevent further processing during follow on portions of the transformation from parse graph to AND/OR command tree. Information about how to carry out commands is hidden or de-emphasized, so that the actual commands, and patterns associated with the actual commands, are easier to discern.

In step 706 of FIG. 7, in one embodiment, selected complex patterns in the parse graph are simplified to create simplified parse graph patterns. The simplification is done piecemeal on whatever portion of the parse graph is being analyzed during the traversal. In other words, one branch or one portion of a branch in the parse graph is simplified at a time. Other processes can then be applied to the simplified piece of the parse graph, before traversing to another portion of the parse graph. Simplification is done by comparing patterns in portions of the parse graph with known simplification cases, to determine which nodes can be skipped or eliminated during follow-on conversion steps. Simplification makes patterns associated with commands in the parse graph easier to identify and convert into AND/OR command tree equivalents.

In step 708 of FIG. 7, in one embodiment, branches on an AND/OR command are created from parse nodes, condensed parse nodes, and the simplified parse graph patterns. As traversing continues, and after simplification and hiding have been accomplished (if applicable), portions of the parse graph are converted into AND/OR command tree branches. Cases that are applicable to the portion of the parse graph being traversed are compared to the portion of the parse graph. When a case matches, that portion of the parse graph (which may contain hidden or simplified information) is converted to an AND/OR command tree equivalent.

In step 710 of FIG. 7, in one embodiment, selected branches on the AND/OR command tree are simplified in accordance with a plurality of AND/OR command tree simplification cases. This is done to refine the command tree, and is done iteratively as each piece of the command tree is constructed. These simplifications are logical simplifications. A non-inclusive list of example simplifications is shown and described in conjunction with Table 8.

In step 712 of FIG. 7, in one embodiment, selected cases in the AND/OR command tree that have common end of line terminations are merged. This is an iterative process that is done as cases are created. If a newly created branch or line is found to share a common EOL with a previously created line or branch, the cases are merged. A non-inclusive list of example merger cases is shown and described in accordance with Table 9.

In step 714 of FIG. 7, in one embodiment, an exportable representation of the AND/OR command tree is created. This exportable representation can be in XML, which is what is used to create the AND/OR command tree during the graph-to-command tree transformation (510 of FIG. 5). Optionally, some embodiments of the present invention can have exportable representations of the AND/OR command tree in other languages. Optionally, other exportable products can be created for use as development tools and/or documentation tools. Optionally, the AND/OR tree can be exported for further processing.

Transforming an AND/OR Command Tree into a Command Data Model

Figure 8:
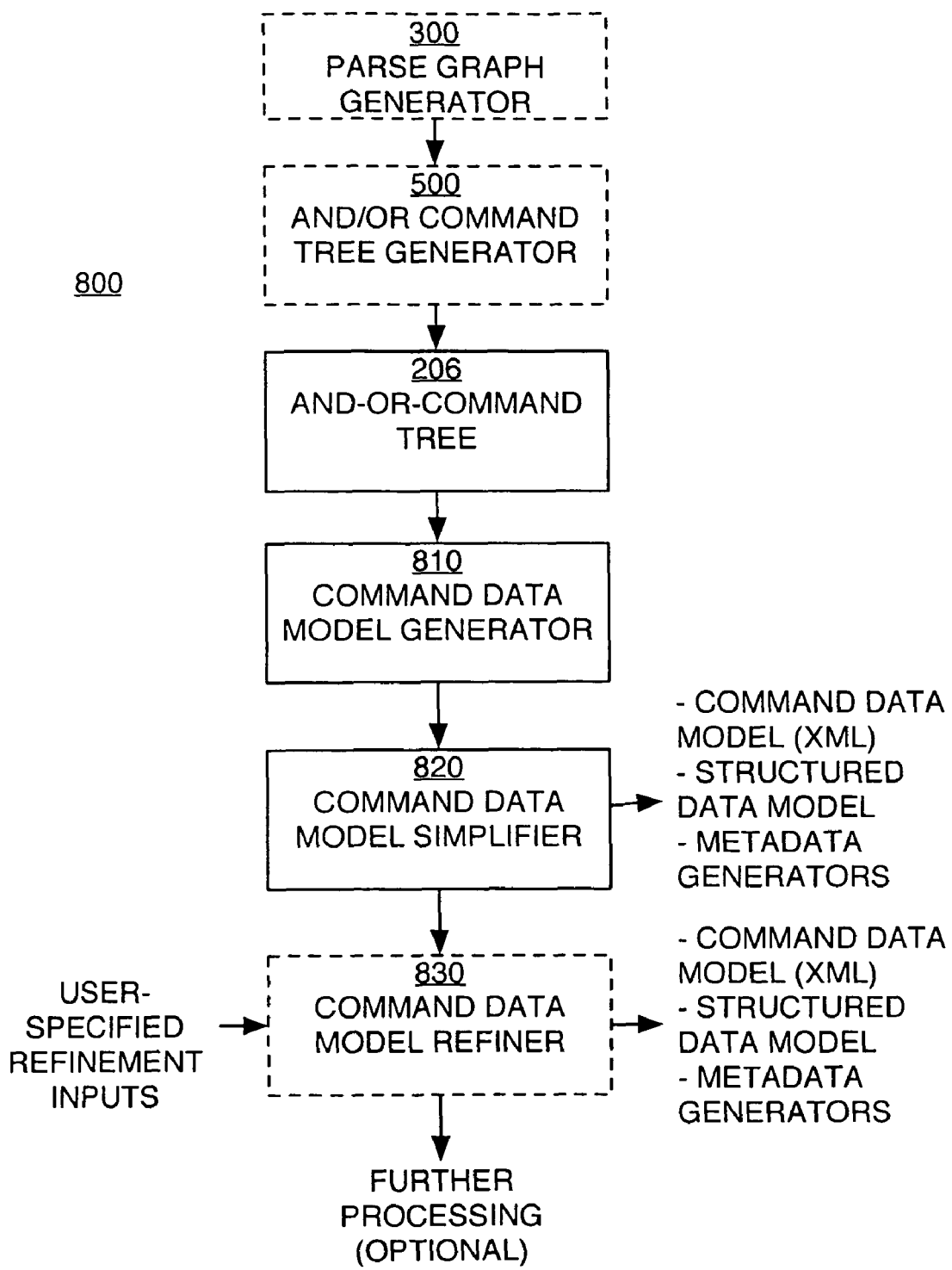
FIG. 8 is a block diagram of a system for transforming an AND/OR command tree into a command data model according to one embodiment of the present invention.

FIG. 8 is a block diagram of a system 800 for transforming an AND/OR command tree into a command data model, in order to clearly express the AND/OR command tree structure containing non-terminal AND/OR nodes as a command data model of CLI commands that can be used as an operational tool, a development tool, or as a foundation for other models. In the present embodiment, system 800 includes an optional parse graph generator 300, an optional AND/OR command tree generator 500, an AND/OR command tree 206 as an input, a command data model generator 810, a command data model simplifier 820, and a optional command data model refiner 830. The work being performed by system 800 is unique, in the sense that the CLI instructions taken as an initial input source to parse graph generator 300 do not have to be designed with a command data model in mind. The present system and method facilitate the incremental generation of a command data model from source code that was designed without a model in mind.

System 300, which was previously described in conjunction with FIG. 3, is used in one embodiment of the present invention to generate a parse graph 204 from CLI instructions. System 300, the parse graph generator, is an optional part of system 800. System 300 is coupled to the input of system 500.

System 500, which was previously described in conjunction with FIG. 5, is optionally used in one embodiment of the present invention to generate an AND/OR command tree 206 of CLI instructions from a parse graph 204 of CLI instructions. AND/OR command tree 206 is an input for command data model generator 810.

AND/OR command tree 206 was previously described in conjunction with FIG. 2. AND/OR command tree 206 is a representation of CLI instructions that serves as a starting data file for what will eventually become a command data model. In some embodiments of the present invention, AND/OR command tree 206 is represented as an XML file. AND/OR command tree 206 is used as an input to command data model generator 810.

Figure 9:
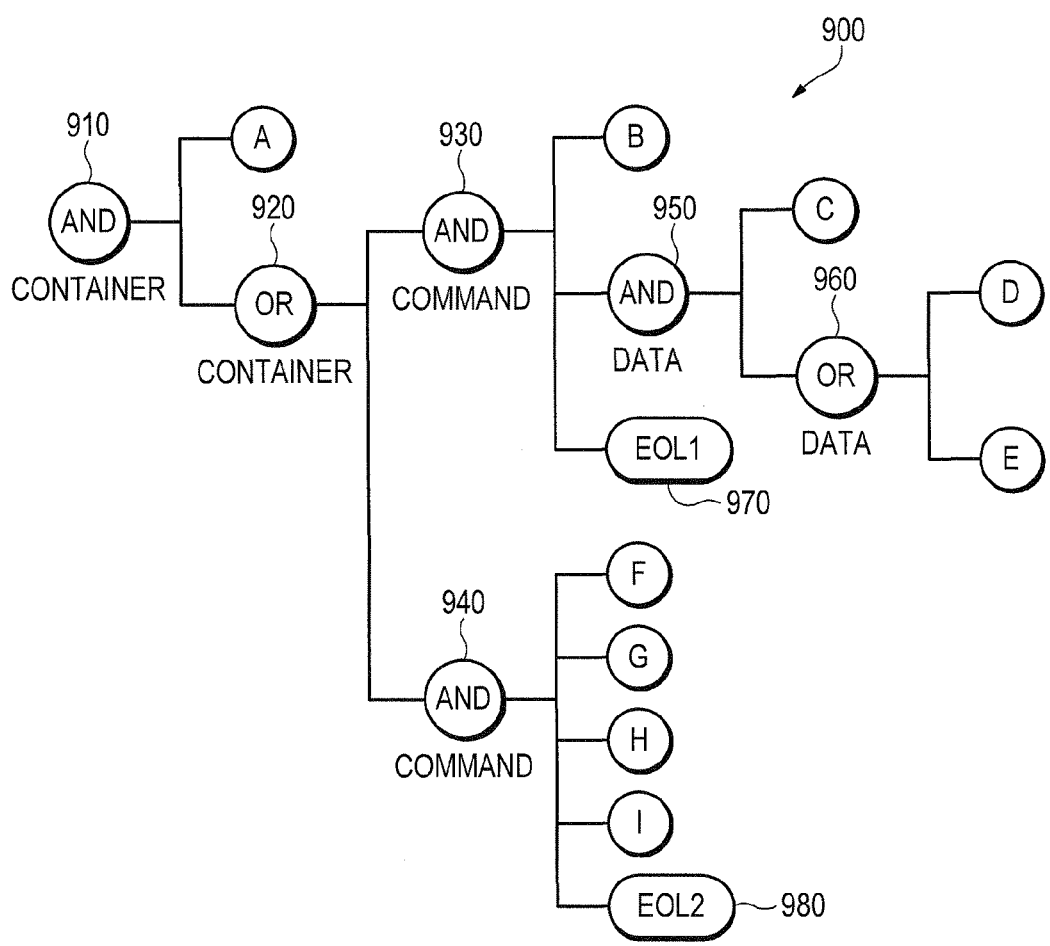
FIG. 9 illustrates an example AND/OR command tree block diagram according to one embodiment of the present invention.

FIG. 9 illustrates an example AND/OR command tree block diagram 900. AND/OR command tree block diagram 900 shows an example of an AND/OR tree with several levels of hierarchy. Logical operator nodes (ANDs and ORs) at different levels within the hierarchy of AND/OR command tree block diagram 900 serve different functions. Some logical operator nodes such as AND node 910 and OR node 920 serve as containers for containing commands and data. Some logical operator nodes such as AND node 930 and AND node 940 serve as command nodes for expressing commands. Some logical operator nodes such as AND node 950 and OR node 960 serve as data nodes for expressing data. The EOL1 node 970 represents a terminal node associated with command AND node 930. The EOL2 node 980 represents a terminal node associated with command AND node 940. The function of each particular node in an AND/OR command tree is taken into account when the command data model is generated by command data model generator 810.

TABLE 10

Example AND/OR Command Tree Structures Represented in Modified EBNF

| | |
|---|---|
| CommandTree | : ( Container-AND-node | Command-AND-node ) + |
| Container-AND-node | : ( Token-node* Container-OR-node ) |
| Container-OR-node | : ( Command-AND-node ) + |
| Command-AND-node | : ( Token-node | Data-AND-node | Data-OR-node ) * EOL-node |
| EOL-node | -> ( Container-AND-node ) * |
| Data-AND-node | : ( Token-node | Data-OR-node ) + |
| Data-OR-node | : ( Token-node | Data-AND-node ) + |

The structure of the AND/OR command tree, which is the source for the command data model can be described using modified Extended Backus-Naur-Form (EBNF) notation with ":" denoting containment and "->" denoting reference. Table 10 shows Examples of various AND/OR command tree structures such as Container-AND-nodes and Data-AND-nodes represented with this modified EBNF notation.

The structure of the generated command data model (and the structured data model if one is generated) can also be described using a modified EBNF notation with ":" denoting containment and "-" denoting reference. Table 11 shows examples of command data model structures represented in modified EBNF.

TABLE 11

Example Command Data Model Structures Represented in Modified EBNF

| | |
|---|---|
| 1. Component | : ( ContainerObjectClass ) + |
| 2. ContainerObjectClass | : ( CommandAttribute | ContainerAttribute ) + |
| 3. CommandAttribute | : ( SimpleTypedCommandAttribute | ComplexTypedCommandAttribute ) |
| 4. ComplexTypedCommandAttribute | – CommandDataObjectClass |
| 5. ContainerAttribute | – ContainerObjectClass |
| 6. CommandDataObjectClass | := ( SequenceCommandDataObjectClass| ChoiceCommandDataObjectClass ) |
| 7. CommandDataObjectClass | : ( DataAttribute ) + |
| 8. DataAttribute | := ( SimpleTypedDataAttribute | ComplexTypedDataAttribute ) |
| 9. ComplexTypedDataAttribute | – DataObjectClass |
| 10. DataObjectClass | := ( SequenceDataObjectClass | ChoiceDataObjectClass ) |
| 11. DataObectClass | : ( DataAttribute ) + |

In Table 11, item 1 shows that Components consist of one or more ContainerObjectClass data types. ContainerAttributes are simply attributes whose data type is another ContainerObjectClass. Item 2 of Table 11 shows that ContainerObjectClass data types, which are like directories, can contain CommandAttributes or ContainerAttributes. Item 3 of Table 11 shows that CommandAttributes can contain a SimpleCommandAttributes or ComplexCommandAttributes. A CommandAttribute is an attribute that represents one complete CLI command. A SimpleCommandAttribute is one that has a simple value such as a basic data type like "number" or "Boolean." A complex data type means that the data type is another ObjectClass.

Line 4 of Table 11 shows that ComplexCommandType references another DataObjectClass at the command level. Line 5 of Table 11 is similar to Line 2, and shows that a ContainerAttribute can reference a ContainerObjectClass. Line 6 of Table 11 shows that a CommandDataObjectClass can contain, either a SequenceCommandDataObjectClass or a ChoiceCommandDataObjectClass. Line 7 of Table 11 shows that a CommandDataObjectClass contains one or more DataAttributes. Line 8 of Table 11 shows that a DataAttribute contains a SimpleTypedDataAttribute or a ComplexTypedDataAttribute. Line 9 of Table 11 shows that a ComplexTypedDataAttribute references a DataObjectClass. Line 10 of Table 11 shows that a DataObjectClass contains a SequenceDataObjectClass or a ChoiceDataObjectClass. Line 11 of Table 11 shows that a DataObjectClass contains one or more DataAttributes.

Command data model generator 810, of FIG. 8, follows a selected set of transformation rules to generate a command data model from AND/OR command tree 206. The resulting command data model is generated by expressing AND/OR command tree 206 as a command tree written in a notation using elements of EBNF (Extended Backus-Naur-Form). This EBNF command tree represents an unsimplified command data model that needs to be evaluated for possible simplification and optionally for possible refinement before the command data model enters its final form. The reference point for model generation is the Command-AND-node (such as node 930 of FIG. 9), which contains an EOL node (such as node 970 of FIG. 9) as its terminal element and represents a distinct CLI command. Because CLI commands can be very complex, some areas of AND/OR command trees can be more complex than illustrated in FIG. 9.

Table 12 shows a basic set of generation rules used to generate the command data model from the AND/OR command tree. These rules are used in a majority of cases, but occasionally rare exceptions will require special handling. For instance, a Command-AND-node is derived with the assumption that it only contains a command that does one function. A special case would be a Command-AND-node that contained several functions. This special case requires the Command-AND-node to be broken down at an inner node rather than at the Command-AND-node level.

TABLE 12

Basic Command Data Model Generation Rules

| | |
|---|---|
| 1. Command-AND-node = | (SimpleTypedCommandAttribute | ComplexTypedCommandAttribute – CommandObjectClass) |
| 2. Data-AND-node = | (SimpleTypedCommandAttribute | ComplexTypedCommandAttribute – SequenceDataObjectClass) |
| 3. Data-OR-node = | ComplexTypedDataAttribute – ChoiceDataObjectClass |
| 4. Container-AND-node = | ContainerObjectClass |

Line 1 of Table 12 shows that a Command-AND-node translates either to a SimpleTypedCommandAttribute or to a ComplexTypedCommandAttribute that references a CommandObjectClass. This corresponds to a CLI that is really simple, such as a keyword followed by a single parameter. Line 2 of Table 12 shows that a Data-AND-node translates to either a SimpleTypedCommandAttribute or a ComplexTypedCommandAttribute that references a SequenceDataObjectClass. A sequence exists because of the AND. Line 3 of Table 12 shows that a Data-OR-node translates to a ComplexTypedDataAttribute referencing a ChoiceDataObjectClass. A choice exists because of the OR. Line 4 of Table 12 shows that a Container-AND-node translates to a ContainerObjectClass.

Table 13 shows an example AND/OR command tree for the "mpls label" command. Adding more commands would make the AND/OR command tree much larger. The AND/OR command tree represented in Table 13 is the starting point for the follow on examples shown in Table 14, Table 15, and Table 17.

TABLE 13

Example AND/OR Command Tree

Container-AND-node
{
   keyword("mpls")
   keyword("label")
   Container-OR-node {
      Command-AND-node TABLE 13-continued Example AND/OR Command Tree

```
        {
            keyword("range")
            number(<min>)
            number(<max>)
            Data-AND-node
            [
                keyword ("static")
                number (<static_min>)
                number (<static_max>)
            ]
            eol (<mpls range function>)
        }           Command-AND-node
        {
            keyword("protocol")
            options("tdp, ldp")
            eol (<mpls protocol function>)
        }
    Command-AND-node
    {
        keyword("holddown")
        number(<holddown time)
        number(<interval)
        eol (<mpls holddown function>)
    }
    Command-AND-node
    {
        keyword("explicit-null")
        Data-OR-node
        [
            Data-AND-node
            (
                keyword("for")
                string(<cfg_mpls_adv_enull_for_acl>)
                Data-AND_node
                [
                    "to"
                    string(<cfg_mpls_adv_enull_for_to_acl>)
                ]
            )
            Data-AND-node
            (
                "to"
                string(<cfg_mpls_adv_enull_to_acl>)
                Data-AND-node
                [
                    "for"
                    string(<cfg_mpls_adv_enull_to_for_acl>)
                ]
            )
        ]
        eol (<ldp expnull advert function>)
    }
  }
}
```

Table 14 shows an example of an unsimplified command data model. Command data model generator 810 (FIG. 8) uses a Java/C++ like syntax and EBNF like notation combined with model generation terminologies and rules similar to those introduced in Table 12, to generate the example unsimplified command data model, shown in Table 14, from the "mpls label" AND/OR command tree in shown in Table 13. In one embodiment of the present invention, the unsimplified command data model generated by command data model generator 810 is output as an XML file. In another embodiment, the unsimplified command data model generated by command data model generator 810 is evaluated for simplification and optionally for refinements. The command data model shown in Table 14 can then be evaluated for possible simplifications and optionally for user-specified refinements.

TABLE 14

Example Unsimplified Command Data Model

```
Component mpls  {
    ConainerObjectClass n_config_mpls_commands    {
        ComplexTypedCommandAttribute mpls_label_range;
        CommandDataObjectClass mpls_lable_range   {
            uint32   min;
            uint32   max;
            ComplexTypedDataAttribute
n_cfg_mpls_label_rnge_static__cfg_mpls_label_rnge_static_max;
            SequencDataObjectClass
n_cfg_mpls_label_rnge_static__cfg_mpls_label_rnge_static_max [
                boolean  static;
                uint32   min;
                uint32   max;
            ]
        }
        SimpleTypedCommandAttribute mpls_label_protocol enum {
            tdp=TAG_PTCL_TDP
            ldp=TAG_PTCL_LDP
        }
        ComplexTypedCommandAttribute  mpls_label_holddown;
        CommandDataObjectClass  mpls_label_holddown    {
            uint32    time;
            uint32    intv;
        }
        ComplexTypedCommandAttribute   mpls_ldp_explicit-null;
        ChoiceCommandDataObjectClass   mpls_ldp_explicit-null {
            ComplexTypedDataAttribute   for;
            SequenceDataObjectClass    for [
                string     for_acl;
                ComplexTypedDataAttribute
n_cfg_mpls_adv_enull_for_to__cfg_mpls_adv_enull_for_to_acl;
                SequenceDataObjectClass
n_cfg_mpls_adv_enull_for_to__cfg_mpls_adv_enull_for_to_acl
                {
                    string to;
                ]
            ]
            ComplexTypedDataAttribute    to;
            SequenceDataObjectClass      to [
                string    to_acl;
                ComplexTypedDataAttribute
n_cfg_mpls_adv_enull_to_for__cfg_mpls_adv_enull_to_for_acl [
                    string   for;
                ]
            ]
        }
        ...
    }
}
```

Command data model simplifier 820 (FIG. 8) follows selected simplification rules to simplify expressions and flatten the hierarchy of the unsimplified command data model generated by command data model generator 810. Simplification is done to create attributes that are not too deeply nested. Each structure in the unsimplified model is analyzed and, if applicable, a simplification or flattening rule is applied selectively to the analyzed structure. Command data model simplifier 820 generates the simplified command data model shown in Table 15 by simplifying the hierarchy under the CommandDataObjectClass, shown in Table 14. In the example shown in Table 14, the "mpls_label_range" and the "mpls_ldp_explicit-null" object classes each have two hierarchies. In other embodiments of the present invention, using more complex CLIs can lead to more hierarchies. The "mpls_ldp_explicit-null" example shows the difference in the unrefined command data model of Table 14 as compared to the simplified command data model of Table 15. In the example model shown in Table 14, the ordering represented by "for" and "to" is not important to the model, and in fact the cases "for" and "to" have the same meaning. This allows for simplification in the transition between the unsimplified model shown in Table 14 and the simplified command data model shown in Table 15.

TABLE 15

Example Simplified Command Data Model

```
Component mpls  {
    ContainerObjectClass n_config_mpls_commands  {
        ComplexTypedCommandAttribute   mpls_label_range;
        CommandDataObjectClass         mpls_lable_range  {
            uint32    min;
            uint32    max;
            [uint32   static_min];
            [uint32   static_max];
            [boolean  static];
        }
        SimpleTypedCommandAttribute mpls_label_protocol enum {
            tdp=TAG_PTCL_TDP
            ldp=TAG_PTCL_LDP
        }
        ComplexTypedCommandAttribute   mpls_label_holddown;
        CommandDataObjectClass         mpls_label_holddown {
            uint32    time;
            uint32    intv;
        }
        ComplexTypedCommandAttribute  mpls_ldp_explicit-null;
        SequenceCommandDataObjectClass mpls_ldp_explicit-null [
            [string   m_for_acl___for]
            [string   m_to___to_acl]
        ] /* mpls_ldp_explicit-null */
        ...
    }
}
```

During simplification, command data model simplifier 820 invokes simplification logic and rules to remove any attributes that are duplicated or unnecessary based on their mapping to the data structure. While simplifying, flattening of "CommandDataObjectClass" to less than "n" levels (where "n" represents a small number such as 1, 2, or 3) is also accomplished. Simplification creates opportunities for flattening the model. The model as represented in Table 15 is a flattened and simplified representation of the model as represented in Table 14. It is important during simplifying to flatten all attributes that map to the same command state block member (which is the parse node containing the action to be performed). Table 16 shows a short list of example simplification and flattening rules used by command data model simplifier 820 to simplify an unsimplified command data model. Table 16 is not an inclusive list; other simplification and flattening rules not listed in Table 16 can also be implemented.

TABLE 16

Examples of Simplification Instructions

1. Remove duplications: Duplicate attributes with the same name and same type are removed
2. Collapse nested unions: nested unions from (A + (B + C)) command tree pattern will not happen because of command tree simplification, however there are other patterns that can lead to nested unions. These nested unions must be collapsed if the members all point to the same command state block data.
3. Merge integers: Integers that go to the same command state block data structure that contains parse information for use in the components action function are merged. Range constrains of the newly merged integer are taken from the minimum of the lower value and the maximum of the upper value.
4. Flatten single child object or union: objects and unions that have only a single child (as the result of a previous simplification) are flattened.

In one embodiment of the present invention, an output from command data model simplifier 820 is a command data model. In one embodiment, an output from command data model simplifier 820 is a command data model expressed in XML. In one embodiment, an output from the command data model simplifier 820 is a structured data model. In one embodiment, an output of command data model simplifier 820 is used as a metadata generator. In one embodiment, the output of the command data model simplifier 820 is sent on to command data model refiner 830 for automated and user-specified refinements.

In one embodiment of the present invention, an optional command data model refiner 830 (FIG. 8) is used to refine the simplified command data model. Names of structures and objects are generated automatically during earlier portions of the command data model creation process, and are often given temporary names. Because of this, it is often useful for a user to customize the command data model for a particular system or application that it is being used with. The abstract command data model is made more specific by allowing user-specified renaming of objects and structures with names meaningful to the user. Command data model refiner 830 allows structures and objects to be renamed or refined. In one embodiment, some of the refinements are automated after the user specifies instructions on how to name or describe structures and objects. In one embodiment, some refinements are user-specified using an XML refinement file that is edited manually to rename objects and structures and to perform manual simplifications. Command data model refiner 830 reads the refinement file, and the command data model is then regenerated with the user-specified refinements.

An example of a user-specified refinement is shown in Table 17. Note how the "n_config_mpls commands" container object class and the two attributes under "mpls_ldp_explicit-null" have been renamed in the refined model shown in Table 17, as compared to the simplified model shown in Table 15.

TABLE 17

Example Refined Command Data Model

```
Component mpls  {
    ContainerObjectClass mpls_global  {
        ComplexTypedCommandAttribute   mpls_label_range;
        CommandDataObjectClass         mpls_lable_range  {
            uint32    min;
            uint32    max;
            [uint32   static_min];
            [uint32   static_max];
            [boolean  static];
        }
        SimpleTypedCommandAttribute mpls_label_protocol enum {
            tdp=TAG_PTCL_TDP
            ldp=TAG_PTCL_LDP
        }
        ComplexTypedCommandAttribute   mpls_label_holddown;
        CommandDataObjectClass         mpls_label_holddown {
            uint32    time;
            uint32    intv;
        }
        ComplexTypedCommandAttribute  mpls_ldp_explicit-null;
        ChoiceCommandDataObjectClass  mpls_ldp_explicit-null [
            [string   for]
            [string   to]
        ] /* mpls_ldp_explicit-null */
        ...
    }
}
```

Other user-specified refinements such as manual simplifications can be specified and the preformed via the command data model refiner 830. In one embodiment, an output from command data model refiner 830 is a command data model. In one embodiment, an output from command data model refiner 830 is a command data model expressed in XML. In one embodiment, an output from the command data model refiner 830 is a structured data model. In one embodiment, an output of command data model refiner 830 is used as a metadata generator.

Figure 10:
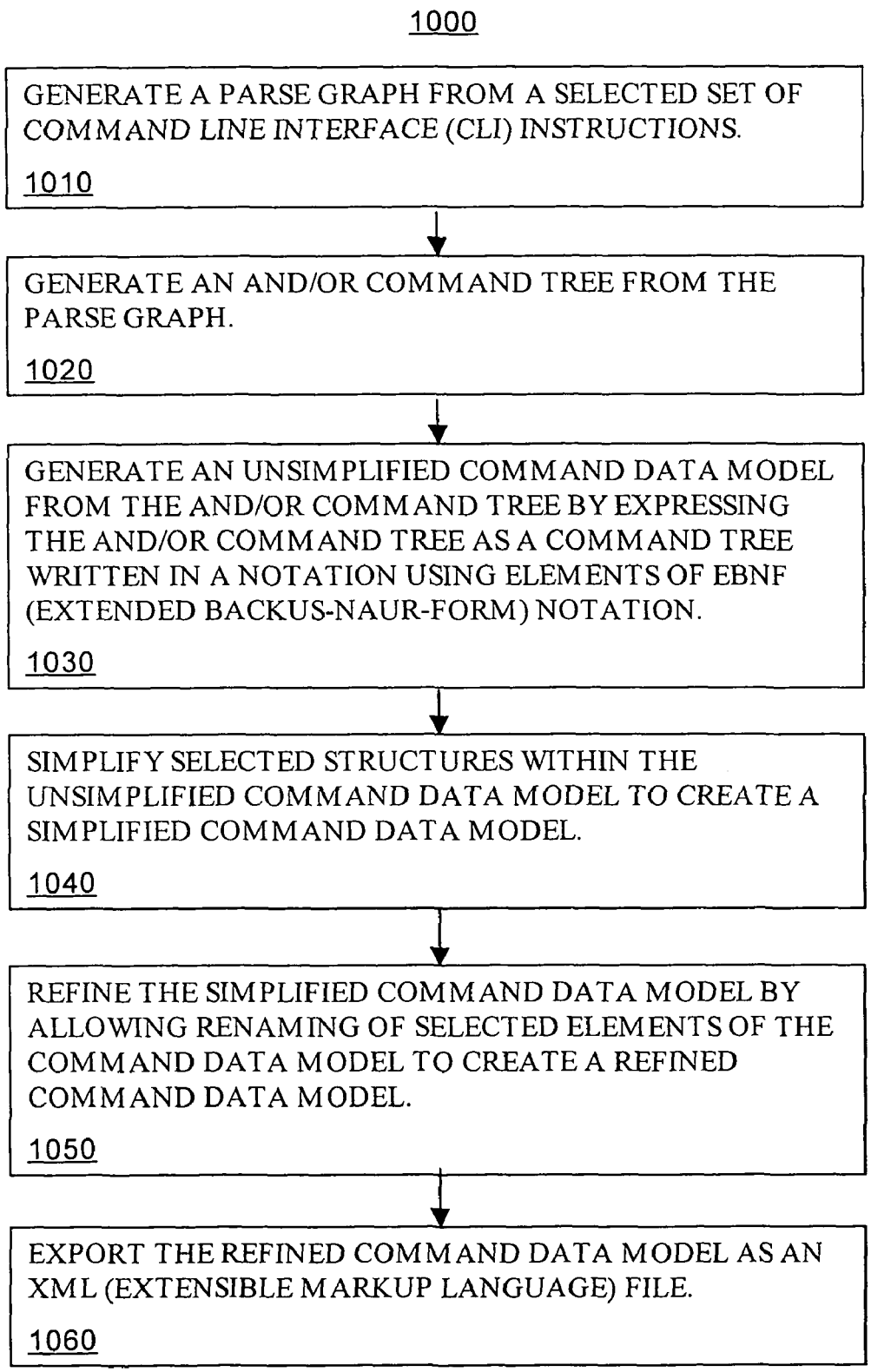
FIG. 10 is a flowchart of a method for transforming an AND/OR command tree into a command data model according to one embodiment of the present invention.

FIG. 10 is a flowchart 1000 of a method for transforming an AND/OR command tree into a command data model according to one embodiment of the present invention. Although specific steps are disclosed in flowchart 1000, such steps are exemplary. That is, embodiments of the present invention are well suited to performing various other (additional) steps or variations of the steps recited in flowchart 1000. It is appreciated that the steps in flowchart 1000 may be performed in an order different than presented, and that not all of the steps in flowchart 1000 may be performed. In one embodiment, flowchart 1000 is implemented as computer-readable program code stored in a memory unit of computer system 112 and executed by processor 101 (FIG. 1).

In 1010 of FIG. 10, in one embodiment, a parse graph is generated from a selected set of CLI (command line interface) instructions.

In 1020 of FIG. 10, in one embodiment, an AND/OR command tree is generated from a parse graph of CLI instructions.

In 1030 of FIG. 10, in one embodiment, an unsimplified command data model is generated from an AND/OR command tree by expressing the AND/OR command tree as a command tree written in a notation using elements of EBNF (Extended Backus-Naur-Form) notation. The generation is done by following a set of transformation rules to transform structures in the AND/OR command tree into structures in the unsimplified command data model.

In 1040 of FIG. 10, in one embodiment, selected structures within the unsimplified command data model are simplified to create a simplified command data model. Selected simplification rules are applied to selected structures that fit the case expressed by the selected rule. As simplification takes place, flattening of the hierarchy of the command data model is also performed. Flattening is also done according to selected simplification rules. Flattening is done to remove duplicate attributes and to remove or merge attributes that are mapped to perform the same action.

In 1050 of FIG. 10, in one embodiment, the simplified command data model is refined by allowing renaming of selected elements of the command data model to create a refined command data model. In one embodiment, some of the refining is automated. In one embodiment, some of the refinement is manually performed. In one embodiment, user-specified renaming of elements and structures is allowed so that the command data model can be more customized for use with a particular network, computer system, or application. In one embodiment, user-specified manual simplification of objects or structures in the command data model is allowed. In one embodiment, user-specified refinements are performed in an XML (extensible markup language) file, and the command data model is then regenerated with the refinements specified in this XML file.

In 1060 of FIG. 10, in one embodiment, the refined command data model is exported as an XML file. In other embodiments, the command data model can be exported in other file formats. In one embodiment the refined command data model is exported as a structured data model. In one embodiment, the command data model is exported for use in metadata generation.

In summary, embodiments in accordance with the present invention provide methods and systems for extracting information contained in C files, C chain files, C macros and C header files and for transforming that information into an externally usable parse graph in the form of an XML document. Significantly, this can be accomplished without a specialized C-language compiler; instead, the C-language constructs are run through a preprocessor (e.g., preprocessor 304 of FIG. 3) and the results are tagged with XML script. The extracted parse graph can be transformed into an AND/OR command tree in the form of an XML document. The extracted parse graph, AND/OR command tree, and related information can be used, for example, in external management systems, for validation of CLI syntax before product delivery, for processing of CLI inputs for discovery, in development and test processes, for transformation to still other formats, for creating automated documentation from code, for creating models of command data, for metadata generation, and for creation of models of object data.

Embodiments of the present invention are thus described. While the present invention has been described in particular embodiments, it should be appreciated that the present invention should not be construed as limited by such embodiments, but rather construed according to the below claims.

What is claimed is:

1. A method comprising:
   extracting, with a processing system, macroinstructions that are hard-coded into parser code of a command line interface (CLI) parser, wherein the macroinstructions define parse nodes utilized by the CLI parser to analyze whether one or more CLI commands input to a CLI prompt have a proper CLI syntax;
   generating a parse graph from the macroinstructions with the processing system, wherein the parse graph includes a representation of the parse nodes defined by the macroinstructions;
   hiding selected information within the parse nodes to create condensed parse nodes with the processing system, wherein the hiding prevents further processing of the selected information;
   simplifying selected complex patterns in the parse graph to create simplified parse graph patterns with the processing system;
   creating, with the processing system, branches on an AND/OR command tree from the parse nodes, the condensed parse nodes, and the simplified parse graph patterns; and
   creating an exportable representation of the AND/OR command tree with the processing system.

2. The method of claim 1 further comprising simplifying selected branches on the AND/OR command tree in accordance with a plurality of AND/OR command tree simplification cases.

3. The method of claim 1 further comprising merging selected cases in the AND/OR command tree that have common end of line terminations.

4. The method of claim 1, further comprising detecting an overarching command structure in the parse graph.

5. The method of claim 1, further comprising collecting the parse nodes that terminate in a common end of line.

6. The method of claim 1, wherein the creating further comprises converting selected patterns into the branches on the AND/OR command tree.

7. A computer-usable memory storing computer-readable program code configured to cause a computer system to perform operations comprising:
   extracting macroinstructions that are hard-coded into parser code of a command line interface (CLI) parser, wherein the macroinstructions define parse nodes utilized by the CLI parser to analyze whether one or more CLI commands input to a CLI prompt have a proper CLI syntax;

generating a parse graph from the macroinstructions, wherein the parse graph includes a representation of the parse nodes defined by the macroinstructions;

hiding selected information contained within the parse nodes to create condensed parse nodes, wherein the hiding prevents further processing of the selected information;

simplifying selected complex patterns in the parse graph to create simplified parse graph patterns; and creating branches on an AND/OR command tree from the parse nodes, the condensed parse nodes, and the simplified parse graph patterns; and creating an exportable representation of the AND/OR command tree.

8. The computer-usable memory of claim 7 further comprising simplifying selected branches on the AND/OR command tree in accordance with a plurality of AND/OR command tree simplification cases.

9. The computer-usable memory of claim 7 further comprising merging selected cases in the AND/OR command tree that have common end of line terminations.

10. The computer-usable memory of claim 7 further comprising detecting an overarching command structure in the parse graph.

11. The computer-usable memory of claim 7 further comprising collecting the parse nodes that terminate in a common end of line.

12. The computer-usable memory of claim 7 further comprising converting selected patterns into the branches on the AND/OR command tree.

13. A system comprising:

a preprocessor to extract macroinstructions that are hard-coded into parser code of a command line interface (CLI) parser, wherein the macroinstructions define parse nodes utilized by the CLI parser to analyze whether one or more CLI commands input to a CLI prompt have a proper CLI syntax;

means for generating a parse graph from the macroinstructions, wherein the parse graph includes a representation of the parse nodes defined by the macroinstructions;

means for hiding selected information contained within the parse nodes to create condensed parse nodes, wherein the hiding prevents further processing of the selected information;

means for simplifying selected complex patterns in the parse graph to create simplified parse graph patterns;

means for creating branches on an AND/OR command tree from the parse nodes, the condensed parse nodes, and the simplified parse graph patterns; and means for creating an exportable representation of the AND/OR command tree.

14. The system of claim 13 further comprising means for simplifying selected branches on the AND/OR command tree in accordance with a plurality of AND/OR command tree simplification cases.

15. The system of claim 13 further comprising means for merging selected cases in the AND/OR command tree that have common end of line terminations.

16. The system of claim 13 further comprising means for detecting an overarching command structure in the parse graph.

17. The system of claim 13 further comprising means for collecting the parse nodes that terminate in a common end of line.

18. The system of claim 13, wherein the means for creating further comprises means for converting selected patterns into the branches on the AND/OR command tree.

* * * * *